United States Patent
Shiraki et al.

(10) Patent No.: US 7,757,748 B2
(45) Date of Patent: Jul. 20, 2010

(54) APPARATUS FOR MELTING METAL BY ELECTRON BEAMS AND PROCESS FOR PRODUCING HIGH-MELTING METAL INGOT USING THIS APPARATUS

(75) Inventors: Takeshi Shiraki, Chigasaki (JP); Yoshihiro Hatta, Chigasaki (JP); Norio Yamamoto, Chigasaki (JP)

(73) Assignee: Toho Titanium Co., Ltd., Chigasaki-shi (JP)

( * ) Notice: Subject to any disclaimer, the term of this patent is extended or adjusted under 35 U.S.C. 154(b) by 260 days.

(21) Appl. No.: 11/814,718

(22) PCT Filed: Jan. 23, 2006

(86) PCT No.: PCT/JP2006/300944
§ 371 (c)(1),
(2), (4) Date: Jul. 25, 2007

(87) PCT Pub. No.: WO2006/080269
PCT Pub. Date: Aug. 3, 2006

(65) Prior Publication Data
US 2008/0105400 A1    May 8, 2008

(51) Int. Cl.
  *B22D 11/00* (2006.01)
  *B22D 27/02* (2006.01)
(52) U.S. Cl. ........................ 164/506; 164/469; 164/494; 164/512
(58) Field of Classification Search ......... 164/469–470, 164/494–497, 506, 508–510, 512, 514–515
See application file for complete search history.

(56) References Cited

U.S. PATENT DOCUMENTS
2,763,903 A * 9/1956 Herres .......................... 164/514
(Continued)

FOREIGN PATENT DOCUMENTS
EP          0 900 854          3/1999
(Continued)

OTHER PUBLICATIONS
Russia Official Action of Appln. 2007132183 dated Feb. 24, 2010 with translation.

*Primary Examiner*—Kuang Lin
(74) *Attorney, Agent, or Firm*—Antonelli, Terry, Stout & Kraus, LLP.

(57) ABSTRACT

The present invention provides an electron-beam furnace and a melting method that, in producing an ingot by melting a metal with an electron beam, can suppress the contamination of new impurities in the ingot production, are less likely to again result in inclusion of once evaporated impurities from a molten metal pool within a hearth or a mold, and can be improved in utilization rate. The electron-beam furnace for melting a refractory metal includes a feeder unit for raw materials, a melting unit for raw materials, which is connected to the feeder unit for raw materials and, at the same time, is defined by a furnace wall and a ceiling wall, and includes at least a hearth, a water-cooled mold, and an electron gun, and an evacuation unit for exhaust gas connected to the melting unit for raw materials. In this electron beam furnace, at least one of the furnace wall and the ceiling wall is lined with titanium or stainless steel, and in addition, plural fin-shaped members formed of titanium or stainless steel are provided at the ceiling wall. A lining, which can be attached and detached, is provided on the inner face of the electron beam furnace.

14 Claims, 3 Drawing Sheets

U.S. PATENT DOCUMENTS

| | | | |
|---|---|---|---|
| 2,997,385 A * | 8/1961 | Winter, Jr. .................. | 75/617 |
| 3,265,801 A | 8/1966 | Eaton | |
| 5,222,547 A | 6/1993 | Harker | |

FOREIGN PATENT DOCUMENTS

| | | |
|---|---|---|
| JP | 62-176667 | 8/1987 |
| JP | 3-13092 | 2/1991 |
| JP | 11-061288 | 3/1999 |
| JP | 11-132664 | 5/1999 |
| JP | 2004-183923 | 7/2004 |
| SU | 2 102 668 C1 | 1/1998 |

* cited by examiner

APPARATUS FOR MELTING METAL BY ELECTRON BEAMS AND PROCESS FOR PRODUCING HIGH-MELTING METAL INGOT USING THIS APPARATUS

TECHNICAL FIELD

The present invention relates to an apparatus and to a method for melting and producing an ingot of a refractory metal such as titanium, and in particular, relates to an electron beam melting technology in which contamination sources such as LDI (Low Density Inclusions) into the ingot is reduced, and the furnace availability is effectively improved.

BACKGROUND ART

Titanium metal has been conventionally used for materials and parts for aviation widely; this titanium metal has been developed for various uses, and it is widely used in building materials, road materials, sporting goods, and the like.

Conventionally, titanium metal has been obtained by producing titanium sponge by the Kroll method (titanium tetrachloride is reduced by magnesium metal to yield titanium), crushing the titanium sponge, forming briquettes by pressing the ground titanium sponge, forming a consumable electrode by combining plural briquettes, and melting the electrode of the briquettes by employing VAR furnace, generally.

However, in order to satisfy the recent demand for improving the purity of titanium ingots, in many cases, an electron-beam furnace, in which a titanium sponge is melted by an electron beam and the molten titanium is flowed into a mold to obtain an ingot, is employed instead of the vacuum arc furnace. In particular, among the electron-beam furnaces, an electron-beam hearth melting furnace is frequently used because of a superior purifying ability.

In the case of using an electron-beam furnace, melting titanium and production of a titanium ingot are performed in the furnace under vacuum pressure in the range from $10^{-3}$ to $10^{-4}$ Torr, which is lower than that in a vacuum arc furnace by 1 to 2 orders of magnitude. Therefore, a high level purification can be realized. As a result, high pure titanium having a purity of 4N to 5N can be produced. However, the electron beam furnace is kept under a high vacuum condition, therefore titanium itself as well as impurities is also evaporated, which is leading a problem in that impurities and titanium are condensed and deposited on the furnace wall and the ceiling wall of the electron-beam furnace, and the impurities and titanium may react with materials of the furnace wall and the ceiling wall, which produce the other compounds.

In this way, the amount of impurities and compounds (hereinafter referred to as "impurities or the like") produced on the furnace wall or the like, are increased in proportion to the heat number of the melting. In this situation, if the impurities or the like attached on the furnace wall are not controlled, the impurities or the like themselves cannot bear their own weights and they will fall into the lower portion of the furnace. If the impurities or the like fall into the molten metal in the mold or hearth, the impurities are newly incorporated into the mold or hearth and which will lower the ingot quality.

Therefore, in the maintenance operation of the conventional electron beam furnace, the metallic powder and metallic agglomeration adhering to the furnace wall are removed as much as possible after completing a sequence of melting processes and pulling the titanium ingot out of the furnace. Depending on the capacity of the furnace and the adhering situations on the inner wall, this maintenance operation typically takes about 3 to 7 days until the furnace is ready to be reused. The next melting operation cannot be performed during the maintenance operation, resulting a decrease of the furnace availability. Under recent circumstances in which the titanium metal demand has greatly increased, it is urgently required that the furnace availability is increased by reducing the time for the melting and the maintenance operation as much as possible.

Conventionally, the maintenance operation is conducted by hand; however, for example, a method without operator's contribution has been suggested, in which method the furnace is washed with high pressure water as a solution for decreasing the furnace availability, (see Japanese Unexamined Patent Application Publication No. 2004-183923). Since high pressure water is employed to remove adhered material in this method, it is expected that the maintenance operation can be completed in a relatively shorter time than that of the maintenance operation by hand.

Several improvements have been made in addition to the above-mentioned methods, and in particular, an improving technique has been disclosed, regarding the ceiling wall or the like of an electron-beam furnace. For example, an apparatus for holding a condensed material has been disclosed, in which apparatus a concave water-cooled surface is arranged on the hearth to collect condensed material of evaporated components of an alloy processed in the hearth (see Japanese Unexamined Patent Application Publication No. Hei 11 (1999)-132664). By this technique, since a large number of concave parts, called a plectrum structured parts, are arranged on the ceiling wall of an electron-beam furnace, solid impurities deposited on the concave parts are effectively inhibited to fall downwardly.

Furthermore, a method for preventing the falling of impurity metal evaporated and deposited in the furnace have been disclosed including a process in which Nb—Al alloy is melted by a heating means in a vacuum, and it is held in a hearth arranged in the furnace while Al is evaporated and purified Nb is flowed into a water-cooled crucible, resulting Nb ingot, and a process in which a rotator with a cooling means is arranged above the water-cooled crucible and a woven stainless net is movably attached below the rotator to keep the evaporated Al the adhering and solidifying state on the woven stainless net with near uniformity and density, (see Hei 11(1999)-061288). In these techniques, impurities and titanium vapor evaporated from a melted pool can be condensed on a circular mesh plate at an upper area of the melted pool held in the mold, and as a result, the amount of the condensed material on the ceiling wall of the electron-beam furnace can be reduced.

Furthermore, a technique has been disclosed, in which technique the entire area of the hearth of the electron-beam is covered with a condensation plate arranged directly there above, and impurities evaporated from the hearth are condensed and caught on the plate, resulting an prevention of impurities contamination from the ceiling wall, (see U.S. Pat. No. 5,222,547).

However, although the time required for washing can be shortened to some extent by the method disclosed in Japanese Publication No. 2004-183923, the washing time of the furnace is not reduced because a certain time is required for washing. The melting process must be in waiting during the washing processes, and it is not solved that the furnace availability is not essentially reduced. In addition, the techniques disclosed in Japanese Publications No. Hei 11 (1999)-132664, No. Hei 11 (1999)-061288, and U.S. Pat. No. 5,222,547 are all aimed to trap titanium vapor and impurities evaporated from the melted titanium layer, held in the hearth or mold, before they reach the ceiling wall or at the ceiling wall.

Solid material is deposited in each technique; however, there is no guarantee that the solid material will not fall into the molten metal pool, depending on the degree of deposition.

In particular, in the case of a titanium ingot for aviation, the ingot should not contain HDI (High Density Inclusions) or LDI (Low Density Inclusions) extremely and impurities into the ingot is not allowed even in the smallest amounts. For such applications, it is essential for developing an electron beam furnace that can efficiently produce titanium ingots with controlling impurities level precisely under the high rate of the furnace availability.

DISCLOSURE OF THE INVENTION

The present invention has been completed in view of the above requirements, and an object of the invention is to provide an electron-beam furnace in which, during production of a titanium ingot by melting titanium sponge or titanium scrap, contamination of additional impurities is suppressed, impurities once evaporated from the hearth or melting metal pool in the mold are difficult to again be brought in the melting metal pool, and the furnace availability thereof is improved by reducing maintenance time.

In view of the situation, the inventors have performed research regarding an electron-beam furnace that can reduce contamination of impurities, which evaporate from the melting metal pool in the hearth or the mold, and will not come into the melting metal pool again. As a result, the inventors discovered that condensed impurities can be held on an upper surface of the fin-shaped member, preventing impurities from falling to the lower part of the furnace by lining at least one of the inner surface of the furnace wall and the ceiling wall with titanium or stainless steel, and by arranging fin-shaped members on the ceiling wall.

It should be noted that the inventors also discovered that the above-mentioned fin-shaped member should be preferably made of titanium or stainless steel; in such a case, corrosion of the furnace wall and the ceiling wall can be effectively reduced due to the titanium vapor from the melting metal pool of the hearth or mold. The present invention has been completed in view of such knowledge.

That is, the electron-beam furnace for refractory metal of the present invention is consisted of a feeder unit for raw materials, a furnace wall connected with the a feeder unit for raw materials, and a ceiling wall; the apparatus has a melting unit for raw material including at least a hearth, a water-cooled mold and an electron gun, and an evacuation unit of exhaust gas connected with the melting unit for raw material; and the apparatus is lined by the titanium or stainless steel on at least a furnace wall and a ceiling wall, and has plural fin-shaped members made of titanium or stainless steel on the ceiling wall.

Furthermore, with the intention of shielding a evaporating route of titanium or impurities from the melting metal pool of the hearth or water-cooled mold to the ceiling wall, the inventors discovered that the amount of titanium vapor from the melting metal pool condensed on the ceiling wall can be effectively reduced by arranging the shield members on the furnace wall so that the shield members are positioned below the ceiling wall. It should be noted that the inventors also discovered that the above-mentioned effect can be sufficiently achieved by arranging the above-mentioned shield members extending from the furnace wall toward the center direction and the upper portion of the apparatus in lateral view. The invention as described below has been completed in view of this knowledge.

That is, in the electron-beam furnace as described above, it is preferable that the shield member be arranged on the furnace wall so as to extend from the furnace wall toward the center direction and the upper portion of the apparatus in lateral view, and it is more preferable that the shield member be made of a metal or a ceramic having a higher melting point than that of the refractory metal. Furthermore, it is especially preferable that the metal or ceramic comprising the shield member be maintained at a temperature not greater than the melting point of the refractory metal. Molybdenum or tantalum is preferable as such a metal, and calcia, yttria or a complex of calcia and yttria is preferable as such a ceramic.

In addition, the inventors discovered that a reaction of titanium vapor or impurities with the furnace wall or the ceiling wall can be greatly reduced and contamination of impurities into melting metal pool can be further suppressed by separating and recovering the titanium vapor or impurities once evaporated from the melting metal pool at a cooling portion (hereinafter referred to as a "condensation tube") additionally arranged downstream of the evacuation unit for exhaust gas in the apparatus. By this technique, the purity of the molten titanium in the hearth or water-cooled mold can be further improved, and as a result, the purity of the ingot can be maintained at an extremely high level. The invention as described below has been completed in view of such knowledge.

That is, in the electron-beam furnace, it is preferable that the condensation tube of the refractory metal vapor be arranged downstream of the evacuation unit for exhaust gas. It should be noted that the condensation tube can be arranged incorporated with the electron-beam furnace, or it can be arranged separately from the apparatus.

Furthermore, the inventors discovered that maintenance operation time of the furnace can be extremely reduced and the furnace availability can be greatly increased by predisposing a removable lining on the inner surface of the electron-beam furnace and by replacing the lining with adhering or deposited material after melting.

That is, the electron-beam furnace for refractory metal of the present invention is consisted of a feeder unit for raw materials, a furnace wall connected with the a feeder unit for raw materials, and a ceiling wall; the apparatus has a melting unit for raw materials including at least a hearth, a water-cooled mold, an electron gun, and an evacuation unit for exhaust gas connected with the melting unit for raw material; and the apparatus further has a removable lining attached on the inner surface of the electron-beam furnace.

The lining consists of a ceiling lining, a side wall lining and a bottom lining. It is preferable that each lining be attachable and detachable separately.

Furthermore, the present invention provides a method for production of a refractory metal ingot in which melting is performed by using the electron-beam furnace having the above-described construction.

In the present invention, additional contamination of impurities can be reduced during melting of refractory metal such as titanium by keeping at least the surface of the furnace wall or ceiling wall in the apparatus in appropriate condition. In addition, the impurities, once evaporated from the melting metal pool and deposited on the ceiling wall, are effectively prevented from again being brought into the melting pool by the arrangement of shield members or a condensation tube. As a result, the quality of ingot can be maintained at an extremely pure level. Furthermore, the lining with deposited metal may be immediately removed and replaced with a newly prepared lining so that the furnace can be reused quickly again in the present invention after the melting of metal is completed, the metal has cooled and is pulled out as an ingot since the lining is removable. In this way, the furnace can be greatly improved. Furthermore, since the frequency for washing operations inside the furnace is reduced, the service life reduction of the furnace by corrosion can be effectively avoided.

EXPLANATION OF REFERENCE NUMERALS 10a to 10d Electron-beam furnace
11 Hearth
12 Water-cooled mold
13 Electron gun
13a Electron beam
14 Outlet nozzle unit for exhaust gas
15 Furnace wall
16 Ceiling wall
17 Fin-shaped member
18 Titanium material
19 Ingot
31 Ceiling lining
32 Side wall lining
33 Adhering material receiving part
34 Bottom lining

MODE FOR CARRYING OUT THE INVENTION

Preferred embodiments of the present invention are explained below with reference to the drawings.

Figure 1:
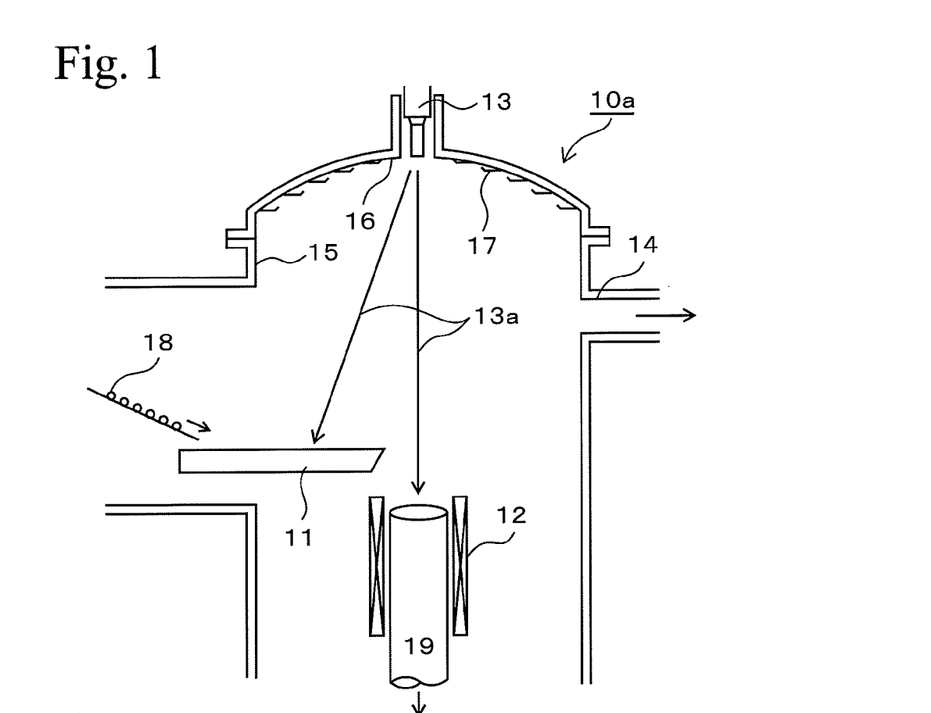
FIG. 1 is a diagram showing a side view of the first embodiment of the electron-beam furnace of the present invention.

FIG. 1 is a side view diagram showing the first embodiment 10a of a preferred electron-beam furnace of the present invention. A hearth 11 in which titanium is melted, a water-cooled mold 12 in which melted titanium is flown from the hearth 11, an electron gun 13 which irradiates electron beam 13a on a molten metal pool in the hearth 11 and the water-cooled mold 12, and an outlet nozzle unit for exhaust gas 14 which connects to a evacuation apparatus, which is not shown, are arranged in the electron-beam furnace 10a. It should be noted that a portion of a feeder unit for raw materials means the left region from the hearth 11 and a portion of melting unit of raw material means the region from the left edge of the hearth 11 to the base of the outlet nozzle unit for exhaust gas 14 and a portion of the evacuation unit for exhaust gas means the right region from the base of the outlet nozzle unit for exhaust gas 14 in FIG. 1.

In addition, in the electron-beam furnace 10a shown in FIG. 1, the furnace wall 15 and the dome-shaped ceiling wall 16 are connected each other, and plural fin-shaped members 17 are arranged on the ceiling wall 16. It is preferable that the furnace wall 15, the ceiling wall 16, and the fin-shaped member 17 be made of titanium or stainless steel. It should be noted that the reason why the ceiling wall 16 is dome-shaped, is that the plural fin-shaped members 17 can be easily arranged on the ceiling wall 16.

In the case that titanium sponge is actually melted to obtain a titanium ingot in the above-mentioned construction of the apparatus, first of all, titanium material 18 as a raw material is fed through the feeder unit for raw materials to the hearth 11, and this is melted by the electron gun 13. Next, melted titanium in the hearth 11 is flown into the water-cooled mold 12, and while controlling the temperature by the electron gun 13, ingot 19 is formed and pulled downward by an ingot pulling means, which is not shown.

In such an electron-beam furnace 10a, since the furnace wall 15 and the ceiling wall 16 are lined by titanium having high corrosion-resistance, the structural materials of the furnace wall 15 and the ceiling wall 16 are not corroded by titanium vapor or impurities evaporated from the melted titanium pool in the hearth 11 or the water-cooled mold, even if the temperature in the furnace is extremely high region during the melting, and the ingot can be reliably produced.

Furthermore, in the above-mentioned series of processes, titanium or impurities are evaporated and moved upward from the melted titanium pool in the hearth 11 or the water-cooled mold 12, a part of the evaporated titanium or impurities is exhausted to the outside through the outlet nozzle unit for exhaust gas 14, and most of the evaporated titanium or impurities reaches the furnace wall 15 and the ceiling wall 16 and then condenses.

As explained, most of the evaporated titanium or impurities reaches the furnace wall 15 and the ceiling wall 16 and condenses, the amount of the condensed titanium or impurities increases according to the heat number of melting the metal, and as a result, the condensed deposits may fall off and fall downward by their own weights. However, since the plural fin-shaped members 17 consisting of the present invention are attached on the ceiling wall 16, the fin-shaped member 17 reveals a function as a tray for holding the condensed titanium or impurities, and the falling thereof into the melting metal pool in the hearth 11 or the water-cooled mold 12 can be effectively avoided. It should be noted that the falling of titanium or impurities held on the fin-shaped member 17 can be avoided more effectively by adding a bent shape at the free edge of the fin-shaped member 17 as shown in FIG. 1.

By the functions and effects described above, the electron-beam furnace 10a of the first embodiment can effectively avoid additional contamination of impurities by the linings on the furnace wall 15 and the ceiling wall 16, and furthermore, quality deterioration of ingots due to the falling of titanium or impurities can be effectively suppressed by arranging plural fin-shaped members 17 on the ceiling wall 16.

Figure 2:
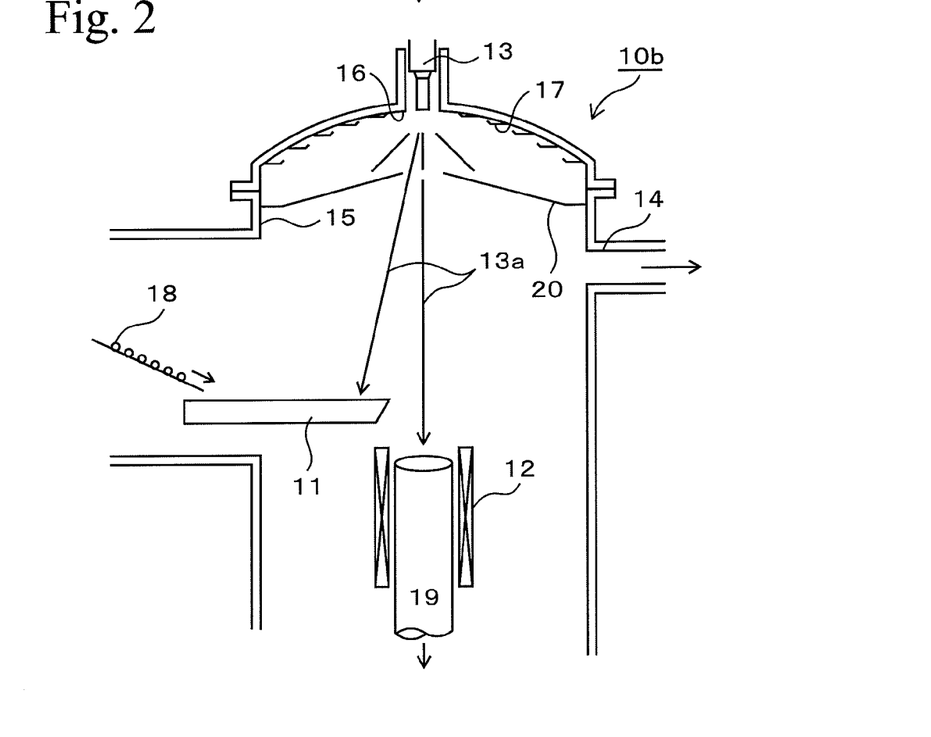
FIG. 2 is a diagram showing a side view of the second embodiment of the electron-beam furnace of the present invention.

FIG. 2 is a side view diagram showing the second embodiment 10b of a preferred electron-beam furnace of the present invention. The basic structure of the furnace of FIG. 2 is similar to that of FIG. 1. Therefore, also in the second embodiment, a portion of a feeder unit for raw materials means the left region from the hearth 11 and a portion of a melting unit for raw material means the region from the left edge of the hearth 11 to the base of the exhaust nozzle 14, and a portion of a evacuation unit for exhaust gas means the right region from the base of the outlet nozzle unit for exhaust gas 14 in FIG. 1.

In the electron-beam furnace 10b shown in FIG. 2, shield member 20 is additionally arranged at the furnace wall 15, and the shield member 20 is positioning below the ceiling wall 16. The shield member 20 is arranged to interfere an evaporation path of titanium or impurities from the melting metal pool in the hearth 11 or water-cooled mold 12 to the ceiling wall 16. It is preferable that the shield member 20 have an inverted-cone shape with an opening through which electron beam 13a passes at its central part; however, another shape may be employed. It should be noted that the shield member 20 is an inverted-cone shape which extending from the furnace wall 15 to a central and upper portion of the apparatus in lateral view in the present embodiment, and even if the impurities or the like fall from the fin-shaped member 17 downward, this structure enables the impurities or the like to be trapped on the shield member 20 and to be prevented from falling below the shield member 20.

It is preferable that the shield member 20 be made of a material having a melting point higher than that of titanium, such as Mo or Ta. It is preferable that the temperature of the shield member 20 be maintained from 1000 to 1600° C., and more desirably from 1300 to 1600° C. However, the temperature is desirably maintained below the melting point of titanium since the member may react with evaporated titanium and may form alloys, deteriorating the strength of the ingot if the temperature reaches the melting point of titanium.

The temperature of the shield member 20 can be maintained within the above-mentioned range by irradiating electron beam 13a or by providing a heater. By maintaining the temperature within the range, deposition of titanium vapor evaporated from the hearth 11 or the water-cooled mold 12 can be restrained on the lower surface of the shield member 20. By the above-mentioned functions, falling and contamination of solid impurities can be reduced, which may cause generation of LDI or HDI, into the hearth 11 or water-cooled mold 12. Therefore, deterioration of the quality of the titanium ingot can be effectively avoided.

On the other hand, as mentioned above, the shield member 20 has a function of capturing titanium or impurities leaving from the lower surface of the fin-shaped member 17 because of their own weights.

Furthermore, the shield member 20 can be made of calcia, yttria, or a complex ceramic thereof. Also in this case, it is preferable that the temperature of the shield member 20 be maintained from 1000 to 1600° C., and more desirably from 1300 to 1600° C. Furthermore, in the case in which the shield member 20 is made of the above-mentioned ceramic, the shield member 20 is desirably maintained within the above-mentioned temperature range with additional heater. Condensation and deposition of the titanium vapor can be reduced by keeping the temperature of the shield member 20 within the high temperature range, and as a result, contamination of impurities into the ingot can be effectively reduced.

The titanium vapor reaching the shield member maintained within the temperature range is partially condensed on the surface of the shield member 20, and most of the titanium vapor existing in the gas phase flows downward in an oblique direction along the inner surface of the shield member 20, and it is exhausted to the outside the furnace, which is not shown.

Figure 3:
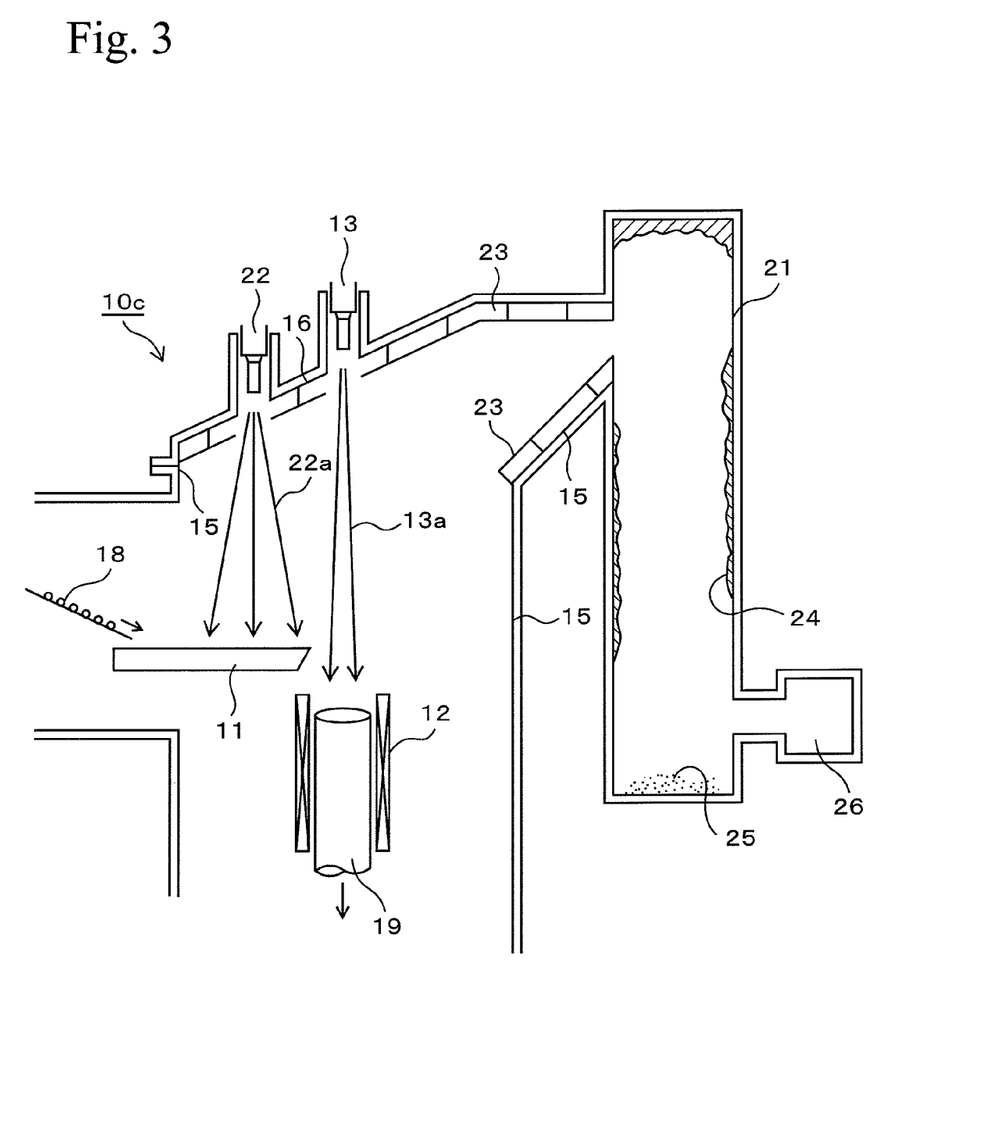
FIG. 3 is a diagram showing a side view of the third embodiment of the electron-beam furnace of the present invention.

FIG. 3 is a side view diagram showing the third embodiment 10c of a preferable electron-beam furnace of the present invention. The embodiment has a structure in which vapor of titanium or impurities from the melting titanium pool in the hearth 11 or water-cooled mold 12 are guided to a condensation tube 21 which is additionally and separately arranged at the furnace 10 downstream of the outlet nozzle unit of the exhaust gas 14 while the vapor is being maintained at a high temperature and in which the vapor of titanium or impurities is cooled to be separated in the condensation tube 21 and recovered. In this embodiment, two electron guns 13 and 22 are arranged, the electron gun 13 irradiates electron beam 13a on the melting titanium pool in the water-cooled mold 12 and the electron gun 22 irradiates electron beam 22a on the melting titanium pool in the hearth 11 at the same time. It should be noted that a portion of a feeder unit for raw materials means the left region from the hearth 11 and a portion of the melting unit for raw materials means the region from the left edge of the hearth 11 to a left side of a tapered portion having a tapered shape consisting of the furnace wall 15 and the ceiling wall 16, and a portion of outlet nozzle unit for an exhaust gas means the region of the tapered part in FIG. 3.

In the electron beam furnace 10c shown in FIG. 3, a heating plate 23 with a corrosion resistance is arranged not only on the ceiling wall 16 but also on the inner surface of the side wall 15. It is preferable that the heating plate 23 be maintained at a high temperature so that the titanium vapor evaporated from the melting metal pool is difficult to be condensed on the heating plate 23. Specifically, it is preferable that the temperature be in a range of 1000 to 1600° C., and it is important that it be maintained so as not to reach the melting point of titanium. Most of the above-mentioned titanium vapor and impurities can be guided to the t condensation tube 21 by maintaining the high temperature without condensing on the heating plate 23. Therefore, the impurities or the like are not transported in the hearth 11 or water-cooled mold 12, and they are separated and recovered as adhering material 24 or deposited material 25 in the condensation tube 21. It should be noted that the heating plate 23 is made of molybdenum or tantalum, which are durable in the above-mentioned high temperature range.

Furthermore, recovery of titanium vapor and impurities can be improved more efficiently by arranging another condensation tube, which is not shown, in the downstream of the condensation tube 21. The amount of metallic powder or dust reaching the evacuation unit 26 arranged in the downstream of the condensation tube 21 can be reduced by such a structure of the apparatus, which contribute to the prolongation of the service life of the evacuation unit 26.

Figure 4:
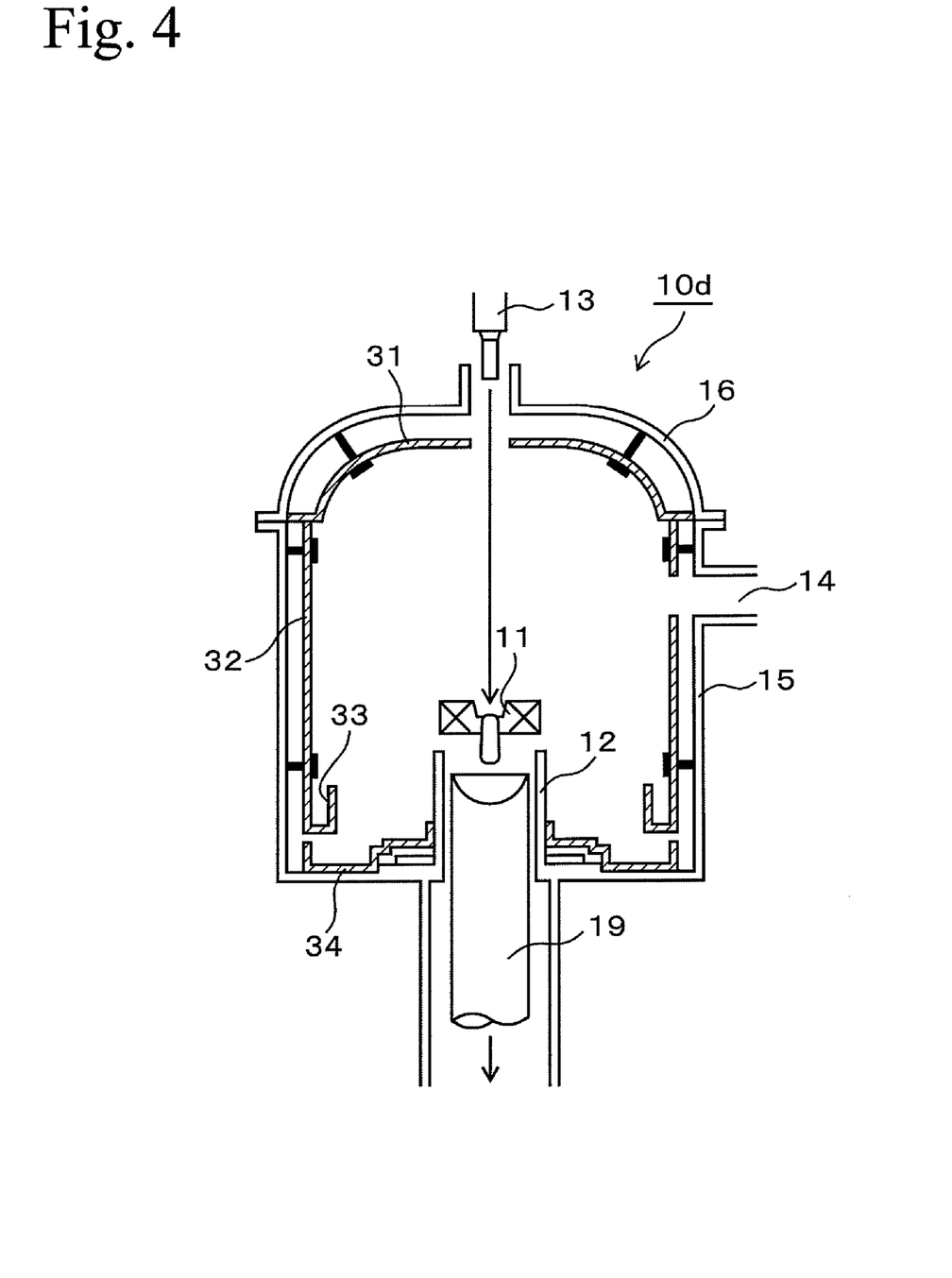
FIG. 4 is a diagram showing a side view of the fourth embodiment of the electron-beam furnace of the present invention.

FIG. 4 is a side view diagram showing the fourth embodiment 10d of a preferred electron-beam furnace of the present invention. FIG. 4 is a conceptual diagram showing the electron-beam furnace 10d in which the apparatus is described from a vertical direction of the viewpoint of FIGS. 1 to 3, and the hearth 11 and the a feeder unit for raw materials are located at the behind the faces. In the electron-beam furnace 10d, a removable ceiling lining 31 is arranged on the inner wall of the ceiling wall 16. Similarly, a removable side wall lining 32 is arranged on the inner surface of the furnace wall 15, and a removable bottom lining 34 is arranged on the inner surface of the bottom wall. The structure of fin-shaped member 17 shown in FIG. 1 can be applied to the ceiling lining 31.

In the electron-beam furnace 10d, a part of the titanium vapor is condensed and deposited on the ceiling lining 31, the side wall lining 32, and the bottom lining 34 from melted titanium pool in the hearth 11 and the melted titanium pool in the water-cooled mold 12. After finishing the operation process of melting and producing the ingot, the furnace is disassembled, each of the linings is replaced with a new lining, and the furnace is again assembled and can be used again immediately for the next melting and production of a titanium ingot. A maintenance operation, such as washing and removing material adhering on the inner wall was required every time after the ingot production in a conventional furnace, and therefore, the furnace availability became low; however, in the present invention, the furnace availability can be greatly improved. It should be noted that washing and removing of material adhering on the disassembled linings can be performed so as to reuse the lining.

Next, each lining is explained in detail.

1. Ceiling Lining

Since titanium vapor generated during the melting process of titanium contains impurity such as low-melting point metals, it is not desirable that deposited material of the vapor be transported in the mold. It seems that the condensed material on the side wall lining and the bottom lining do not directly affect the ingot quality so much among the linings because it is difficult for it to fall into the mold due to the positions; however, in particular, the condensation is promoted regarding the ceiling lining arranged over the melting titanium if the deposited material is left as it is, and the deposited material may fall into the melting metal by its own weight. Therefore, it is desirable for the ceiling lining with a structure in which the deposited material is difficult to fall off.

For example, it is preferable that the above-mentioned fin-shaped members be provided. As shown in FIG. 1, the fin-shaped member desirably has a structure extending horizontally from the ceiling wall. Furthermore, the top edge part of the fin-shaped member is desirably bent upward. By such a structure, falling of adhering material is effectively reduced.

In addition, in another embodiment, a network structure of the metal is considered to be preferable as a ceiling lining. If the ceiling lining has a network structure, the deposited material hangs in concave portions, and it is more difficult for the deposited material to fall downwardly, compared to the case of a ceiling wall having a planar structure. Material for the network structure can be made of stainless steel; however, titanium can be used if contamination of the final product must be inhibited severely. Falling of deposited material adhered and accumulated on the ceiling lining can be effectively reduced by such a structure and arrangement.

It is preferable that the ceiling lining have a structure such that it can be attached and detached from the ceiling wall relatively easily. For example, bolting or an attachment structure is preferable like hooking. By using the above structure, the ceiling lining can be easily attached and removed by using a crane. As a result, falling of adhering material during attaching and removing from the ceiling lining can be effectively prevented.

2. Side Wall Lining

A side wall lining is used by attaching on the inner wall part of the apparatus, and the side wall lining also desirably has a structure easily attached and removed, similar to the case of the ceiling wall. Specifically, bolting or an attachment structure using a hook is preferable.

Material of the side wall lining is desirably made of a metal, especially stainless steel having superior corrosion resistance. Furthermore, titanium is more desirable as a side wall lining in case that contamination by impurities is inhibited extremely. It should be noted that synthetic resin with a heat resistance can be applied as a part of sidewall material in case that radiation heat from the hearth or the mold is relatively low and the temperature does not increase so high. The synthetic resin is appropriate for a treatment of water-washing and drying since the synthetic resin has a superior corrosion-resistant.

It is preferable that a condensed material received in the groove 33 be engaged and arranged at the lower edge of the side wall lining as shown in FIG. 4. The condensed material is effectively captured by arranging such a groove 33 for receiving condensed material, if the condensed material falls from the surface of the side wall lining. As a result, falling of condensed material to the bottom part of the furnace can be effectively avoided. Furthermore, the condensed material can be purified and be reused as a titanium raw material.

The side wall lining can be constructed as a metallic planar structure; however, similar to the case of the ceiling lining, it can have a network structure. Falling of the adhering material can be effectively avoided by making the side wall lining of a net structure.

3. Bottom Lining

A bottom lining is attached on the bottom part of the electron-beam furnace 10d, and it desirably has a structure covering the bottom portion of the furnace as much as possible. The condensed material in attaching or removing of the ceiling lining or side wall lining can be effectively recovered by this structure.

To give the bottom lining the above-mentioned function, the bottom lining can be made of metal; however, it can also be made of a synthetic resin with a heat resistance. A lining fitted to the shape of the bottom part of the electron-beam furnace 10d can be obtained by making the bottom lining using such a synthetic resin.

As the synthetic resin, for example, a vinyl chloride or a styrene type resin can be used, and FRP can also be used. FRP is an appropriate construction material as the bottom lining of the present invention since it is light and has high strength.

There are many cases in that the bottom portion of the furnace includes a mold, and its affixing members or the like therefore have complicated shapes due to the concave and convex parts. Therefore, first of all, it is desirable to take a bottom portion to arrange a bottom lining which can accommodate such a complicated bottom part, and synthetic resin is cast into the mold to obtain the bottom lining. By constructing the bottom lining in this way, a bottom lining closely attached to the bottom part of the furnace can be constructed.

4. Embodiment of Practical Operation

Since there are some cases in which the material is deposited on the inner wall of the furnace by titanium vapor leaking through a gap between linings, it may be desirable that the main body of the furnace be washed after all the linings are disassembled from the furnace, if necessary. In the case in which there seems to be no contamination inside the apparatus by adhering material, after linings having adhering material are disassembled, a replacement lining provided in advance can be immediately attached on the inner surface of the main body of the furnace.

After completion of the installation of the linings, the ceiling portion is engaged to the main body and the pressure inside the furnace is reduced. After confirming that the pressure inside has achieved a certain degree in vacuum, an electron beam is irradiated into the hearth and a stub held in the water-cooled mold to begin the melting operation mentioned above.

As explained so far, in the fourth embodiment, after finishing the melting process, the next melting process can be started by merely disassembling the electron-beam furnace 10d, removing the linings, and attaching new linings which have been prepared. Conventionally, after disassembling the furnace, adhering material deposited on the ceiling or inner wall of the furnace has been removed manually, and this operation required about 5 to 7 days, and this was the main cause of the poor rate of the furnace availability.

As explained above, by use of the furnace with linings of the fourth embodiment, the maintenance time required after completion of melting and production of an ingot can be greatly reduced, and as a result, productivity of the furnace can be extremely improved. In addition, since the frequency of washing the inside of the furnace can be reduced, reducing the service life of the furnace by corrosion can also be prevented effectively.

EXAMPLES

The effect of the present invention is examined in the following examples.

Example 1

Using the apparatus having a structure shown in FIGS. 1 to 3, 1000 kg of titanium sponge was melted by an electron beam in each apparatus to obtain titanium ingots. This operation was repeated 5 times using each apparatus to obtain 5 ingots, and the LDI in each titanium ingot generated was analyzed; however, no LDI was detected in each titanium ingot. Each ingot was forged and rolled to obtain thin plates, and they were then examined for LDI by X-ray illumination.

Comparative Example 1

Using an apparatus having a structure shown in FIG. 1, not having linings on the furnace wall 15 and ceiling wall 16, and not having fin-shaped member 17 on the ceiling wall 16, five titanium ingots were produced in a manner similar to that in Example 1. The presence of LDI in the five titanium ingots was observed, and one piece of LDI having a diameter of about 1 to 2 mm was detected in the first and the fourth ingots.

Example 2

Using the electron-beam furnace 10d having an output of 2000 kW and having the ceiling lining, side wall lining, and bottom lining shown in FIG. 4, 15 ingots, each having a weight of 10 t, were produced. After the temperature in the furnace was reduced to room temperature, the furnace was disassembled, and the ceiling lining, side wall lining, and bottom lining were removed in that order. Next, after the inside of the furnace was cleaned, each lining which had been treated was attached on the inner surface of the furnace 10d to reassemble the furnace 10d to prepare for the next melting process. The time required for the preparation was 3 days.

It should be noted that the linings removed from the furnace were ground, washed with water, and dried to be prepared for the next assembling.

Comparative Example 2

Melting process was conducted in conditions similar to that of Example 2, except that the linings of the present invention were not attached. After finishing the melting process, the furnace was disassembled, and the inside thereof was cleaned, washed with water, and dried. Next, the furnace was assembled to prepare for the next melting process. The time required for the process was six days.

As explained in Example 2 and Comparative Example 2, by the electron-beam furnace for metals and the melting method using the apparatus of the present invention, the effect that the time required for maintenance of the furnace after the melting process can be greatly reduced has been confirmed.

The present invention is useful for production of titanium ingots for aviation in which incorporation of LDI is desired to be reduced to a very high degree, and the present invention can greatly improve the utilization rate of furnaces.

The invention claimed is:

1. An electron-beam furnace for melting refractory metal, comprising:
   a feeder unit for raw materials;
   a melting unit for raw materials which is connected to the feeder unit for raw materials and which is constructed of a furnace wall and a ceiling wall; and
   an outlet nozzle unit of exhaust gas that is connected to the melting unit for raw materials,
   the melting unit for raw materials further comprising at least a hearth, a water-cooled mold, and an electron beam gun,
   wherein titanium or stainless steel is lined on at least one of the furnace wall and the ceiling wall, and wherein plural fin-shaped members made of titanium or stainless steel are disposed at the ceiling wall.

2. The electron-beam furnace according to claim 1, wherein a shield member is arranged on the furnace wall so that the shield member is extending from the furnace wall to the central and upper direction of the furnace viewed laterally.

3. The electron-beam furnace according to claim 2, wherein the shield member is made of a metal or ceramics selected from the group consisting of molybdenum, tantalum, calcia, yttria, and a complex of calcia and yttria having a melting point higher than that of the titanium, zirconium, niobium, or vanadium.

4. The electron-beam furnace according to claim 3, wherein the temperature of the metal or ceramics of the shield member is maintained at the temperature lower than the melting point of the refractory metal.

5. The electron-beam furnace according to claim 3, wherein the shield member is made of molybdenum or tantalum.

6. The electron-beam furnace according to claim 3, wherein the shield member is made of calcia, yttria, or a complex thereof.

7. The electron-beam furnace according to claim 1, wherein a condensation tube for metal vapor of the refractory metal is arranged downstream of the outlet nozzle unit for the exhaust gas.

8. The electron-beam furnace according to claim 1, wherein the electron-beam furnace is for producing titanium, zirconium, niobium, or vanadium.

9. A method for production of a refractory metal ingot, comprising a step of using the electron-beam furnace according to claim 1.

10. The electron-beam furnace according to claim 2, wherein a condensation tube for vapor of the refractory metal is arranged downstream of the outlet nozzle unit for exhaust gas.

11. The electron-beam furnace according to claim 3, wherein a condensation tube for vapor of the refractory metal is arranged downstream of the outlet nozzle unit for exhaust gas.

12. The electron-beam furnace according to claim 4, wherein a condensation tube for vapor of the refractory metal is arranged downstream of the outlet nozzle unit for exhaust gas.

13. The electron-beam furnace according to claim 1, wherein the feeder unit for raw materials feeds titanium, zirconium, niobium, or vanadium.

14. The electron-beam furnace according to claim 1, further comprising a source of raw materials selected from the group consisting of titanium, zirconium, niobium, or vanadium.

* * * * *